(12) United States Patent
Sherman et al.

(10) Patent No.: US 11,451,914 B2
(45) Date of Patent: Sep. 20, 2022

(54) SYSTEM AND METHOD FOR HYBRID IN-PERSON AND REMOTE AUDIO/VISUAL CONFERENCE BROADCASTING

(71) Applicant: Social Microphone, Inc., Palo Alto, CA (US)

(72) Inventors: Kenneth Nathaniel Sherman, Santa Barbara, CA (US); Andrew Michael Livingston, Palo Alto, CA (US)

(73) Assignee: Social Microphone, Inc., Montecito, CA (US)

( * ) Notice: Subject to any disclaimer, the term of this patent is extended or adjusted under 35 U.S.C. 154(b) by 8 days.

(21) Appl. No.: 17/408,411

(22) Filed: Aug. 21, 2021

(65) Prior Publication Data

US 2021/0385593 A1 Dec. 9, 2021

Related U.S. Application Data

(60) Continuation of application No. 17/006,865, filed on Aug. 30, 2020, now Pat. No. 11,102,595, which is a
(Continued)

(51) Int. Cl.
*H04R 27/00* (2006.01)
*H04R 3/00* (2006.01)
(Continued)

(52) U.S. Cl.
CPC ............ *H04R 27/00* (2013.01); *H04M 3/568* (2013.01); *H04R 3/00* (2013.01); *H04M 2207/18* (2013.01);
(Continued)

(58) Field of Classification Search
CPC .... H04R 27/00; H04R 3/00; H04R 2227/003; H04R 2420/07; H04M 3/568;
(Continued)

(56) References Cited

U.S. PATENT DOCUMENTS 5,862,329 A * 1/1999 Aras ...................... H04N 7/152
709/251

* cited by examiner

*Primary Examiner* — Andrew L Sniezek
(74) *Attorney, Agent, or Firm* — Brian Billett; James Angus Cardie

(57) ABSTRACT

A hybrid in-person and remote audiovisual conference broadcasting system provides a centrally controlled system for managing and broadcasting the audiovisual data collected from mobile devices both in humanly perceptible proximity of an in-person public-address system and beyond humanly perceptible proximity to the in-person public-address system. In an exemplar embodiment, a moderator controls requests from various participant members to broadcast audio or video from their personal mobile device to the other group members. Some members may be in proximity to an in-person public address system where they may for example be able to hear amplified audio and see live projected or otherwise presented video. In this exemplar embodiment, remote users not in proximity to the in-person public address system may also participate by for example listening to and viewing the broadcast audiovisual data on their personal mobile devices. Both in-person/local users and remote users may request to be selected for broadcasting to all users.

20 Claims, 8 Drawing Sheets

Related U.S. Application Data continuation of application No. 15/865,073, filed on Jan. 8, 2018, now Pat. No. 10,764,697, which is a continuation of application No. 14/988,598, filed on Jan. 5, 2016, now Pat. No. 9,866,979, which is a division of application No. 13/844,412, filed on Mar. 15, 2013, now Pat. No. 9,232,307, which is a continuation-in-part of application No. 13/430,618, filed on Mar. 26, 2012, now Pat. No. 8,452,026, which is a continuation-in-part of application No. 12/220,791, filed on Jul. 28, 2008, now Pat. No. 8,144,893.

(60) Provisional application No. 60/962,067, filed on Jul. 26, 2007.

(51) Int. Cl.
*H04M 3/56* (2006.01)
*H04W 24/00* (2009.01)
*H04W 74/00* (2009.01)
*H04W 88/02* (2009.01)
*H04W 72/00* (2009.01)
*H04W 84/18* (2009.01)

(52) U.S. Cl.
CPC .... *H04R 2227/003* (2013.01); *H04R 2420/07* (2013.01); *H04W 24/00* (2013.01); *H04W 72/00* (2013.01); *H04W 74/00* (2013.01); *H04W 84/18* (2013.01); *H04W 88/02* (2013.01)

(58) Field of Classification Search
CPC . H04M 2207/18; H04W 24/00; H04W 72/00; H04W 74/00; H04W 84/18; H04W 88/02
See application file for complete search history.

FIG. 1

| |
|---|
| PROVIDING A COMMUNICATION AND DISPLAY VENUE |
| PROVIDING A CENTRAL COMMUNICATION POINT |
| ENABLING WIRELESS COMMUNICATION TRANSMISSION FROM USERS AT THE VENUE TO THE CENTRAL COMMUNICATION POINT |
| RECEIVING AUDIO AND/OR VIDEO COMMUNICATION TRANSMISSION FROM USERS AT THE CENTRAL COMMUNICATION POINT |
| RECEIVING AND/OR BROADCASTING THE COMMUNICATION TRANSMISSIONS FROM THE USERS |
| OPTIONALLY QUEUING THE COMMUNICATION TRANSMISSIONS FROM THE USERS |
| OPTIONALLY REBROADCASTING TEXTUAL COMMUNICATION TRANSMISSIONS FROM THE USERS |
| OPTIONALLY REBROADCASTING VIDEO COMMUNICATION TRANSMISSIONS FROM THE USERS |

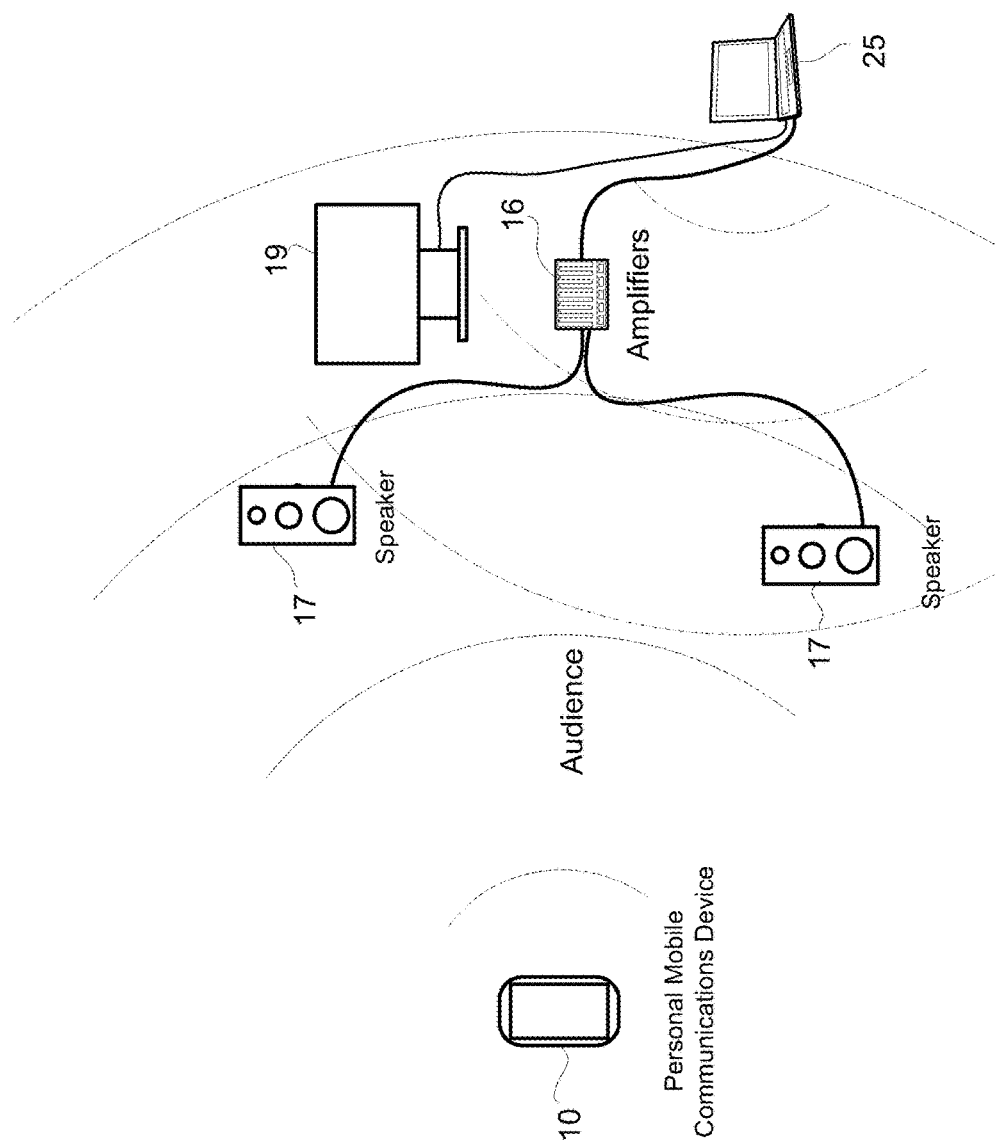

SYSTEM AND METHOD FOR HYBRID IN-PERSON AND REMOTE AUDIO/VISUAL CONFERENCE BROADCASTING

RELATED APPLICATIONS

This patent application is a continuation of U.S. patent application Ser. No. 17/006,865 filed on Aug. 30, 2020, which is a continuation of U.S. patent application Ser. No. 15/865,073 filed on Jan. 8, 2018, issued as U.S. Pat. No. 10,764,697 which is a continuation of U.S. patent application Ser. No. 14/988,598, filed on Jan. 5, 2016, issued as U.S. Pat. No. 9,866,979, which is a divisional application of U.S. patent application Ser. No. 13/844,412, filed Mar. 15, 2013, issued as U.S. Pat. No. 9,232,307 on Jan. 5, 2016, which is a continuation-in-part patent application of U.S. app. Ser. No. 13/430,618, filed Mar. 26, 2012, issued as U.S. Pat. No. 8,452,026 on May 28, 2013, which is itself a continuation-in-part application of U.S. app. Ser. No. 12/220,791, filed Jul. 28, 2008, and which issued as U.S. Pat. No. 8,144,893 on Mar. 27, 2012, which in turn claims priority from U.S. Provisional Patent Application No. 60/962,067, filed Jul. 26, 2007, and having the title, MASH-UP OF PHYSICAL SPACE AND CYBERSPACE. Each of the above patents and patent applications is incorporated herein in their entirety.

FIELD OF THE INVENTION

The present invention relates to the field of communications, particularly closed environment communication, local conferencing and the use of existing voice and data messaging systems in these fields of communication.

BACKGROUND

There are numerous personal mobile communication devices available on the market at the present time, such as cellular phones, PDA's (Personal Digital Assistants), WiFi and Bluetooth laptop processors (PC and Mac), smartphones, such as the Apple iPhone, Samsung Galaxy, and other hand-sized, computer-based communication devices, and even electronic tablets, such as the Apple iPad, the ASUS Nexus 7 and the like with mobile communication applications. Despite their ubiquity, the technology for these systems is still underutilized and use has focused on their primary functions and not derivative or ancillary capabilities, especially when combined with other technologies.

In conferences, meetings, classrooms and the like, a typical question-and-answer period allows participants to ask questions from the floor. In a large venue without amplification, others in the room often have trouble hearing the speaker. Commonly, a microphone is provided in one or more aisles or a portable microphone is passed to a person wishing to ask a question. This can force people to maneuver their seating towards the aisles where microphone access might be more easily available, or cause some significant and disturbing activity in audiences and lead to disruption of the underlying meeting. The movement of the microphones through the audience can be tedious, slow (e.g., from one extreme corner of a room to another) and cumbersome. There can also be such significant jousting for attention as to be disconcerting to participants and lead to a loss of audience control.

This current system also may not work because a microphone is not available, does not work well, or there is no portable microphone handy near the participant who wishes to speak. Often, the participant speaker doesn't properly use a microphone—waving it about or placing it too far away from his or her mouth while speaking—thus negating the advantages of the microphone.

SUMMARY

The present invention addresses or substantially mitigates these problems.

Conventional data transmission systems are used in a group setting for data transmission from participants to a central communication point for sequential communication of information from participants, through the central communication point to the group. Individual data transmissions can be queued (if extended communications), received and downloaded if textual in content, or otherwise organized in a received or reception available status. Vocal communications can be broadcast on a conventional speaker/broadcast system by uploading the vocal communication from a participant, and electronically inputting it into a multi-speaker system (preferred) or a single speaker system. Data transmission may be fed into a display unit for display to the moderator only (to screen incoming materials) or directly onto a group display or a combination of the two.

Other objects, features, and advantages of the present invention will become apparent upon consideration of the following detailed description and the accompanying drawings, in which like reference designations represent like features throughout the figures.

BRIEF DESCRIPTIONS OF THE DRAWINGS

FIG. 1 shows a flow diagram of a process according to the present technology.

Figure 3:
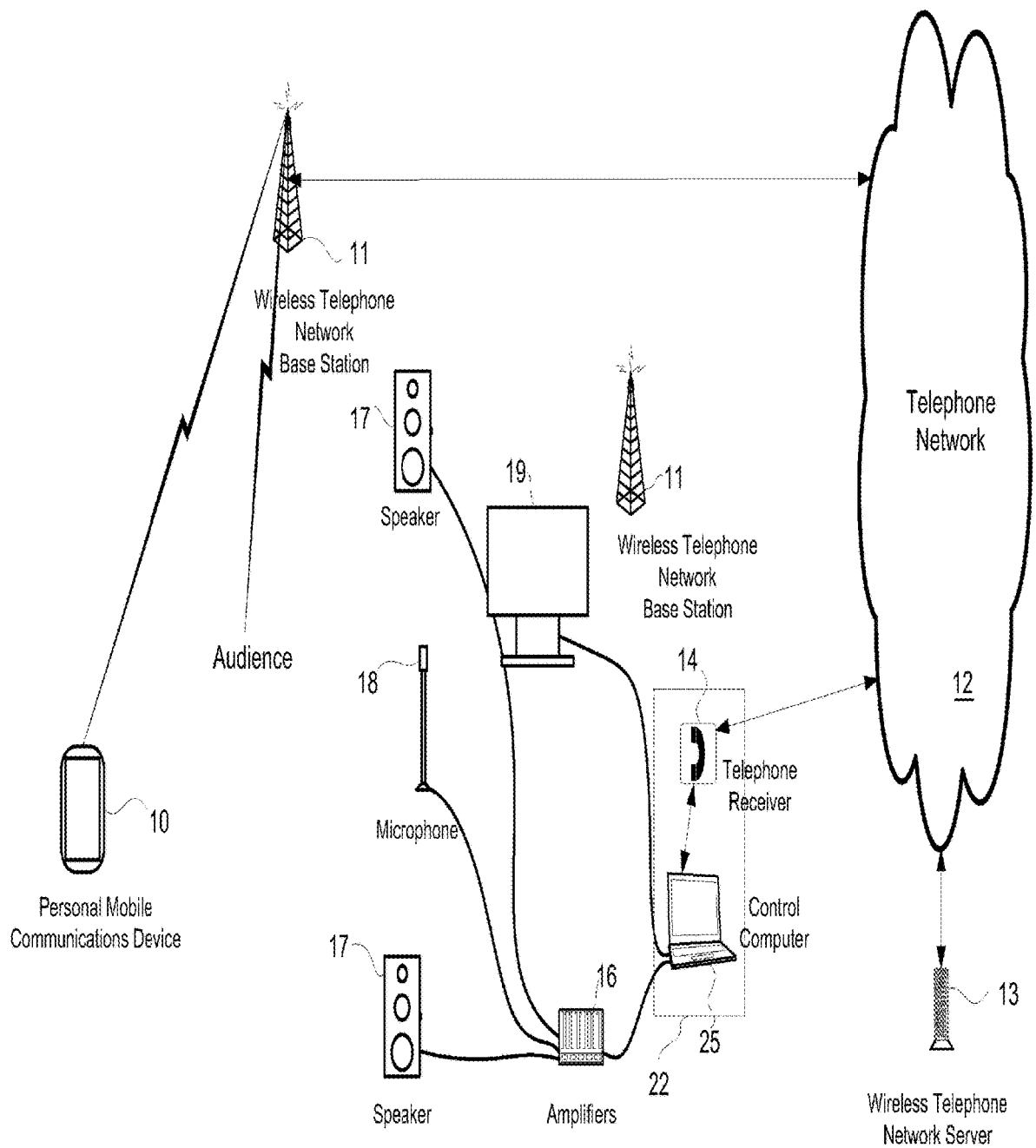
Figure 4A:
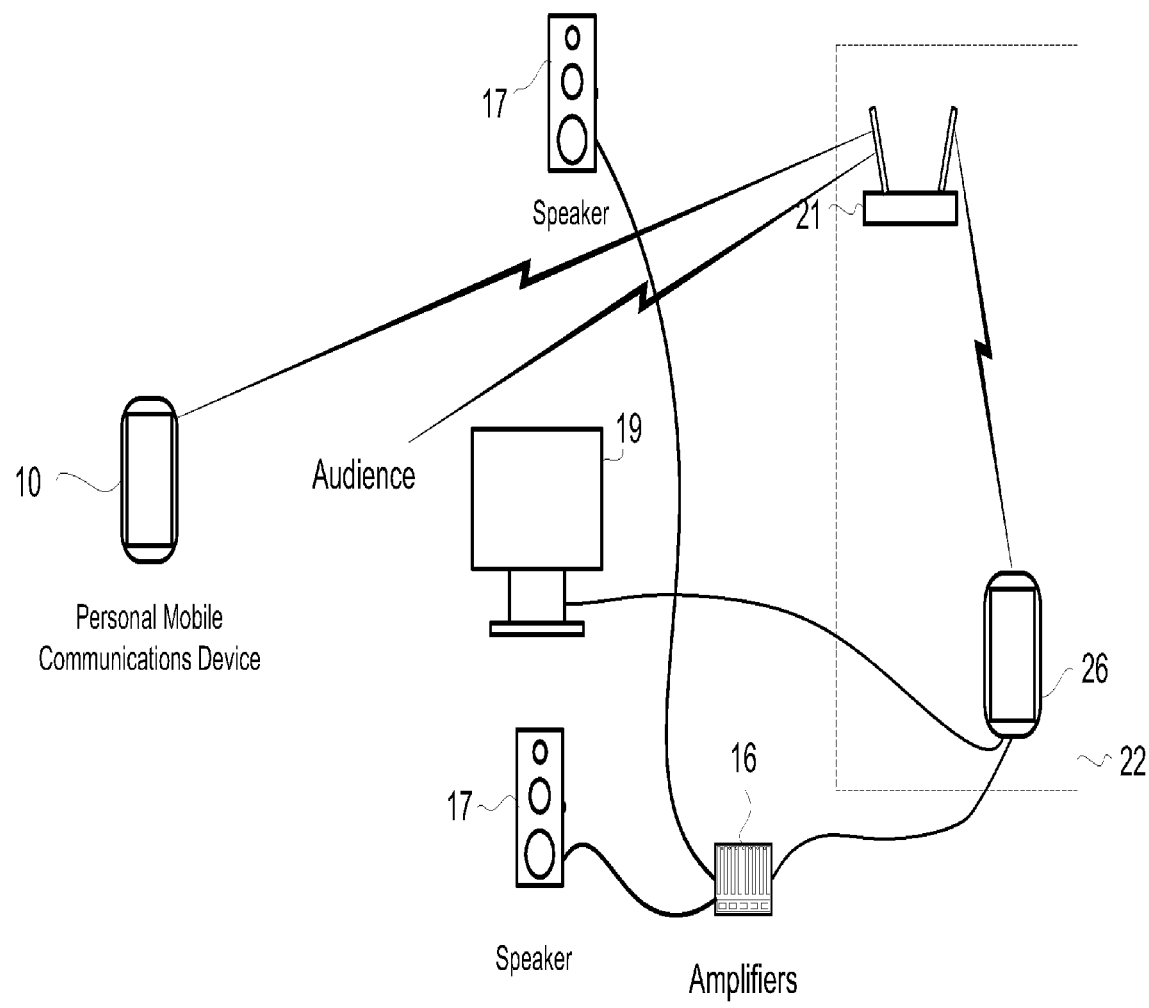
Figure 4B:
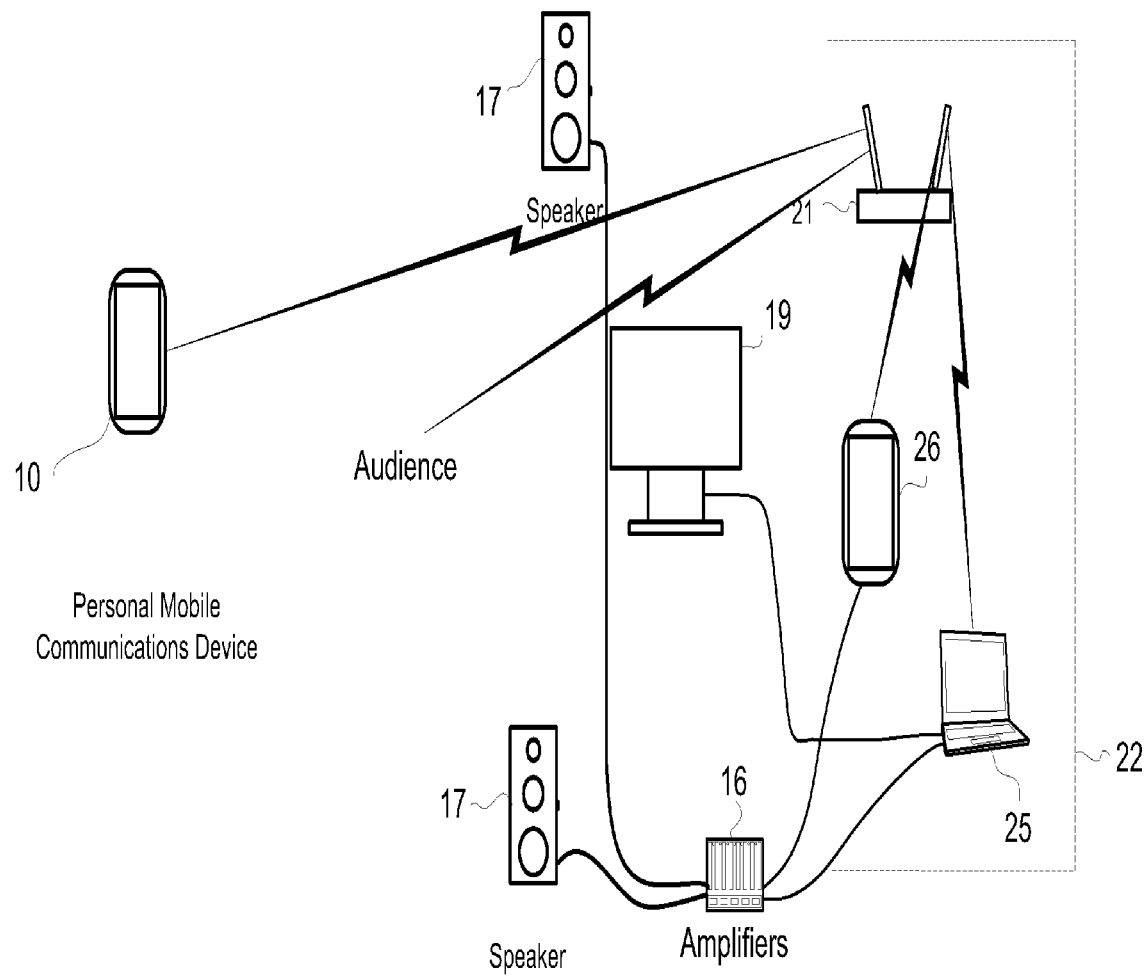

FIG. 3 shows one embodiment of the present invention in which mobile telephone network systems are used for communication from an audience member. FIG. 4A shows another embodiment of the present invention in which WiFi technology is used for communication from an audience member; FIG. 4B shows a variation of the FIG. 4A network arrangement; FIG. 4C shows another embodiment of the present invention in which Bluetooth technology is used.

Figure 5A:
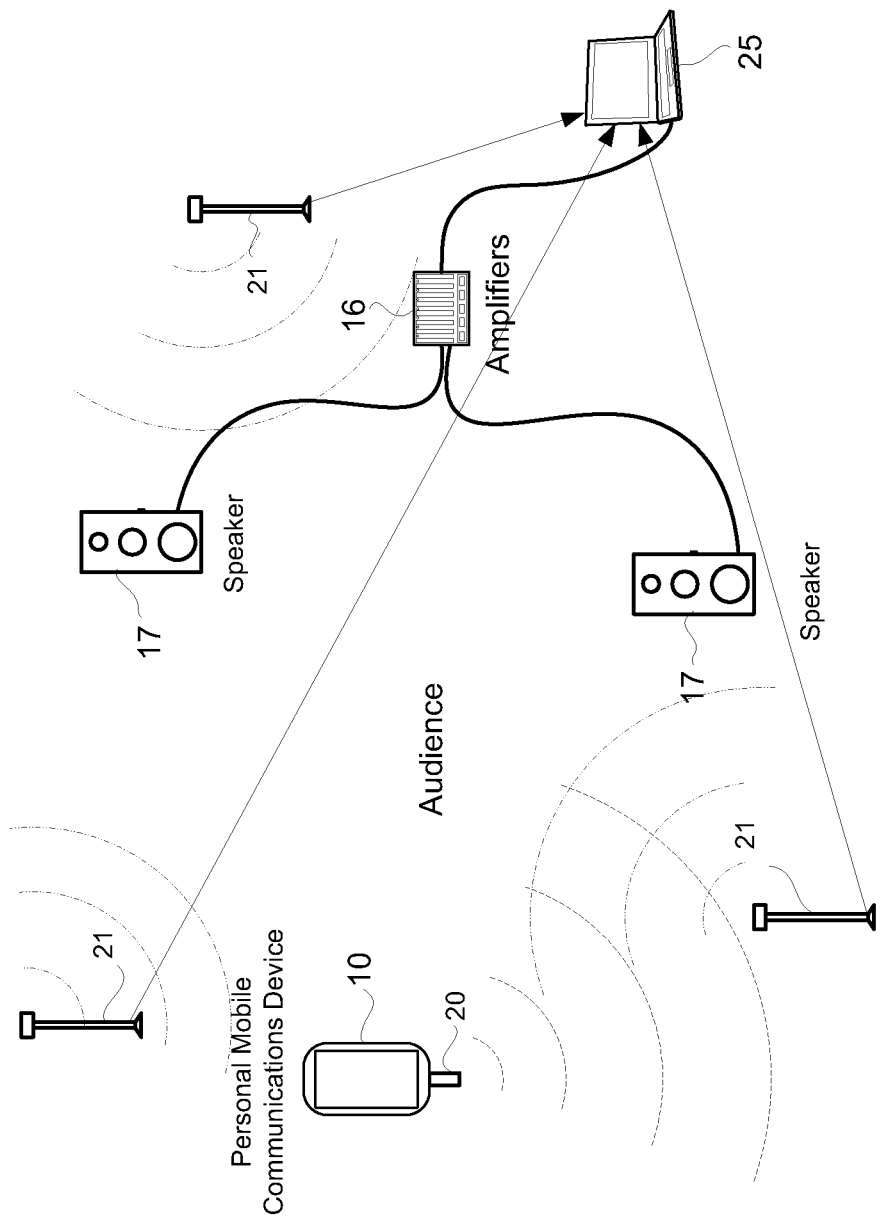
Figure 5B:
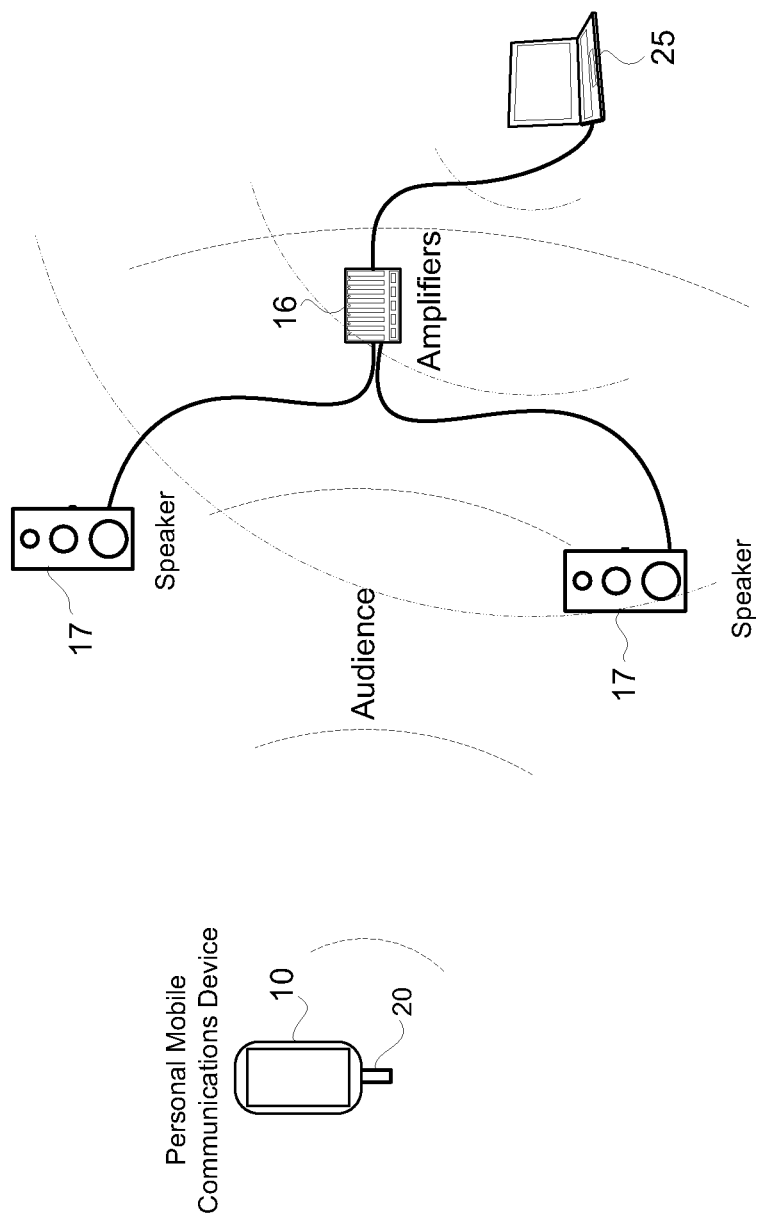

FIG. 5A shows still another embodiment of the present invention in which a dongle is used with an audience member's personal mobile communications device; and FIG. 5B shows a variation of the FIG. 5A network arrangement in which a control computer directly receives the signals from the dongle.

DESCRIPTION

Figure 2:
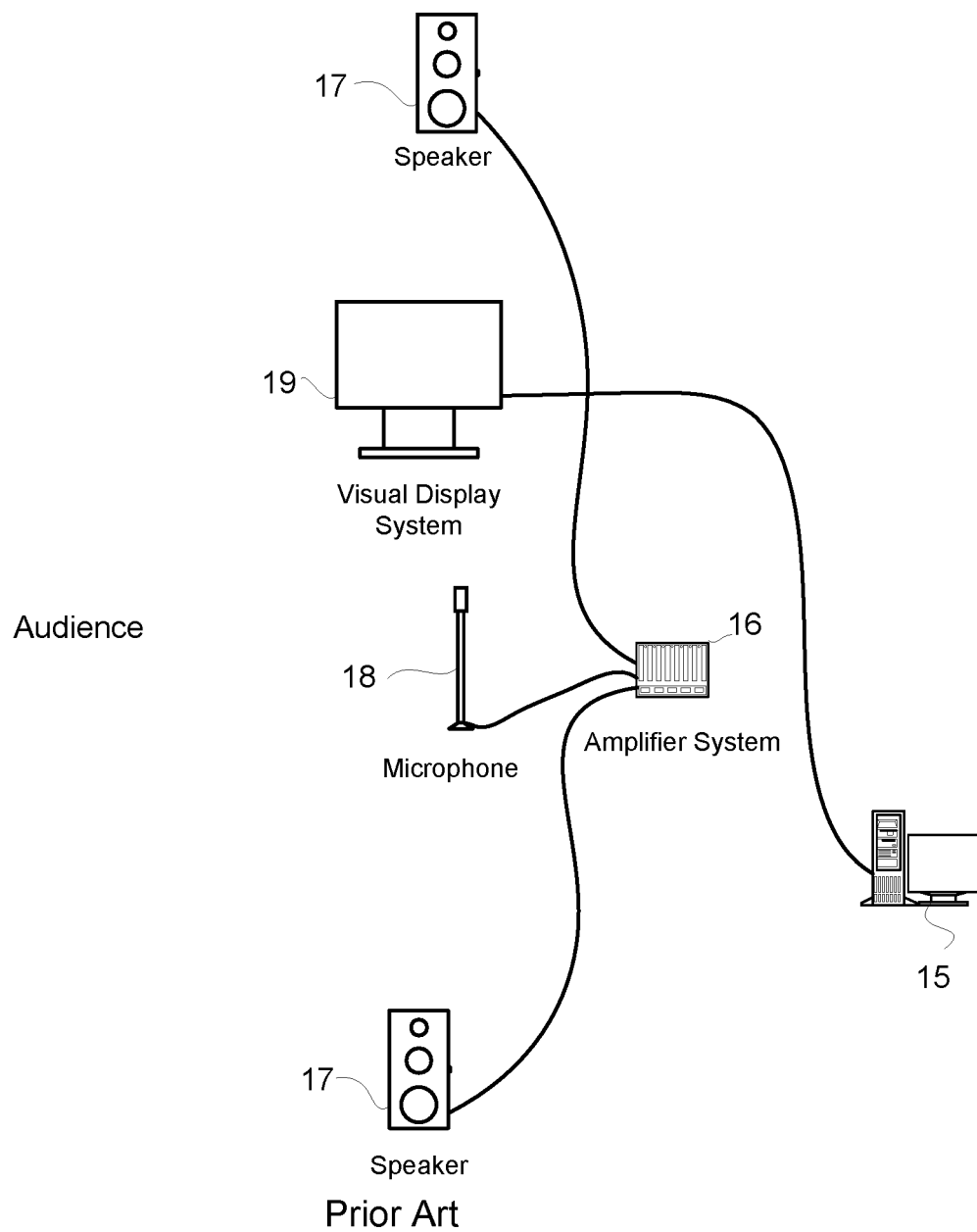
FIG. 2 shows a venue with a conventional sound amplification system.

The present invention is well adapted to conventional sound amplification systems commonly used at conferences, meetings, classrooms, and other venues, often called public address systems. One or more microphones are connected by wire or connected wirelessly to a public address or sound amplification system through specified inputs, such as microphone inputs, line inputs, auxiliary inputs, etc. Each microphone can be equipped with its own ON/OFF switch. If more than one microphone is turned on at the same time, the operator can select one particular microphone, using an input switch on the preamplifier or the amplifier, or by using software (Macro Media Flash Player is one example) to control a computer which directs the operation of the sound amplification system so that only one microphone input is activated at one time. Sometimes, a single microphone is passed from one speaker to another. Such a conventional sound amplification system or public address system is illustrated in FIG. 2. For purposes of simplification, only a single microphone 18, an amplifier system 16 (which includes preamplifier and amplifier elements) and audio speakers 17 are shown. To help the speaker(s) make his or her points to the audience, the speaker may use a visual display system 19, such as a screen and slide projectors or, more currently, a screen with electronic projectors, or even an electronic display connected to a computer 15, such as shown in FIG. 2. Though shown as a conventional desk top computer, a lap top computer is typically used to operate the visual display system. The speaker prompts the visual display system 19 by a conventional remote control device (not shown).

The present invention fits into such public address systems with various embodiments, some of which are illustrated in the drawings and description below.

In accordance with the present invention, a central communications point having visual and/or audio communication capability to a group is established. A speaker's table, podium, raised stage position and the like are useful, and the presence of an audio system (e.g., speakers, broadcast system, etc. of a public address system) and/or a visual display system (e.g., projector, electronic panel display, etc.) is preferred to allow for general hearing and viewing by an audience. Such an arrangement is represented in FIG. 3 in which an audience is addressed by a public address system formed by speakers 17 and amplifiers 16 with a central microphone 18. A visual display system is not shown in this example to avoid visual clutter. The system may also enable more distal attendance at the presentation/interaction, as with cameras and closed circuit or broadband distribution of content over the Internet, for example.

A central receiving function is also provided at the central communications point. This may be provided by a receiver in a telephone system (with a phone number available to participants), a text receiving device (again a cellular phone, PDA, smartphone, laptop or special instrumentation that can receive text or vocal transmission) and one or more computers to handle the functions described below. In FIG. 3 the central receiving function is provided by the combination 22 of a telephone receiver 14 and a control computer 25 in the form of a laptop computer which is connected to the public address system. Individuals at the event (attendees) are provided with contact information for transmitting data to the central receiving function, such as a telephone number, website, e-mail address or any other access information needed to direct transmission of information to the central receiving function. The central computer 25 helps provide a queuing function for the central receiving function. For example, software and hardware is commercially available for call waiting, or queuing (as is done in commercial services, such as airline reservations or customer service functions accessed by telephone). Electronic textual information is more easily queued, as is common with stacking of e-mail transmissions in the order in which they are received.

At a prescribed time in the conference, or even during the conference before a question-and-answer session, individual attendees (local or distal) transmit their communication to the central location and their transmissions are accepted and/or queued according to defined criteria. One significant advantage of the system is that the individual attendees are able to use their own personal equipment and their own personal communication network with which they are already familiar, and they do not have to learn an available system provided entirely by the event managers. Persons on AT&T, Verizon, Sprint, T-Mobile, or other telephone transmission networks can telephone a given number, just as laptop users (whether PC or MAC) can use their own web-carriers or network managers to deliver an e-mail to the central location, with no retraining needed.

Attendees/participants in a conference, meeting room, classroom, or other venue may use their personal mobile communications devices, such as cellular telephones or smartphones, as microphones to address others in the room via the public address or sound amplification system. Thus in one embodiment, a mobile telephone or smartphone, for example, is used in combination with a public address system to allow the prospective speaker's voice to be heard over the sound amplification system. The present invention takes advantage of the fact that most conference and meeting attendees carry their personal mobile communication devices with them. In FIG. 3, audience members and participants use their personal mobile communication devices 10, such as cellular phones, smartphones and like to call the telephone receiver 14 through a wireless telephone network 12 including wireless telephone base stations 11 and network servers 13.

The system includes methods that centrally control communication at a single venue. The central communications point with a moderator (which may be fully automated by a processor or by a live presenter) is provided. Information, at least at the venue, is provided by the attendees, for example, for transmitting electronic signals to the central communications point. The moderator enables at least one electronic communication transmission from an attendee/participant who has access to the central communications point to have at least part of the transmission broadcast at the venue or allow open communication from the attendee/participant to be broadcast at the venue. The attendee/participant electronic signals may be transmitted by wireless cellular phone transmission to a telephone system at the central communication point, or may be transmitted by WiFi processor-based transmission to a processor system at the central communication point, or by other wireless networks. The processor system at the central communications point may receive transmission through a hard-wired system, a WiFi system, or by other wireless networks. These network arrangements are described below. The electronic communication transmission may comprise or consist of textual information, video information and/or audio information. Each electronic communication from a user may be queued for response at the central communications point.

In one embodiment of the communication system disclosed herein and illustrated by FIG. 3, each attendee/participant who wishes to speak uses his personal mobile communications device to call the phone number that is unique to the telephone receiver(s) associated with the central communications point. The attendee caller, in turn, is connected to the conventional sound amplification system, i.e., public address system. The phone number for each system, or room might be listed in a program or posted at the front of the room. Remote participants can take advantage of the system to call the room from their remote location, in which case the attendees hear the question through the public address system. The central communications point has one or more telephone receivers, represented by a telephone receiver 14, which is connected to the amplifier system 16 and speakers 17, which form the public address system, through a control computer 25. The central communications point also has a visual display system 19 connected to the control computer 15. Among its components, the control computer 25 has one or more processors, memory elements, input/output units, such as keyboard, mouse and display, and network connection units.

When the attendee's personal mobile communications device 10 calls the provided number, the call is directed by a nearby wireless telephone transceiver base station 11 of a wireless telephone network 12 which includes one or more wireless telephone network servers 13 which direct(s) the call to the intended destination. As represented in FIG. 3, the call is directed back to the wireless telephone base station 11 which sends the call to the central communications point telephone receiver 14 and the control computer 25 by which the central communications point can direct the call through the amplifier system 16 and speakers 17. The speaker with the mobile telephone 10 can now address the audience through the public address system. To connect the telephone receiver 14 to the public address system, programming code held in the memory elements of the control computer 25 instructs the computer processor(s) to make the connection.

Furthermore, other members of the audience can use their own personal mobile communications devices to call into the central communications point 22 to allow the members to see and hear the presentation at the venue directly. Each audience member can hear the audio signals broadcast from the presentation and questions posed to the moderator, for example, and see the presentation on the visual display system 19 through his personal mobile communications device 10. This is beneficial to members of the audience who are aurally and/or visually impaired personally or by their situation at the venue. Additionally, for those hearing-impaired audience members who do not use personal mobile communications devices, the control computer 25 can send the audio signals to an audio induction loop system whereby hearing aids in the audience transmit the audio signals for the public address system. Audio induction loop systems are placed in many public locations for the benefit of the hearing-impaired.

Besides connections through mobile telephone networks, the present invention also provides for other network arrangements. FIG. 4A illustrates an arrangement with a local wireless network and a local receiver of the central communications point which sends the voice information signals over the public address system for the audience to hear. Many personal mobile communication devices, for example, smartphones, PDA's (Personal Digital Assistants), electronic tablets, such as the Apple iPad, the ASUS Nexus, the Samsung Galaxy and other devices, are already or may easily be equipped for audio communication over WiFi, which uses RF (Radio Frequency) signals. As shown in FIG. 4A, the wireless information from the attendee/participant's personal mobile communication device 10 is received by a wireless access point 21. The wireless access point 21 connects the personal mobile communications device 10 to a second personal mobile communications device 26 which is connected to the public address system with the amplifier system 16 and speakers 17. This local wireless communications channel from one personal mobile communications device 10 to another device 26 operates under the standards of IEEE 802.1 1n (Multi-Media, WMM) for Quality of Service. Attendee/participant packetized data is sent via TCP (Transmission Control Protocol) separately from the audio signals, which are sent under UDP (User Datagram Protocol); the control signals operate under TCP (Transmission Control Protocol).

In the local wireless network arrangement of FIG. 4A, it is advantageous that the personal mobile communications devices 10 and 26 be applications-programmable, such as smartphones. Since smartphones are nearly ubiquitous in modern society, the devices 10 and 26 below are described as smartphones, though it should be understood that the devices should not necessarily be so limited. Applications for smartphones are called "apps" and that terminology is used below. In one embodiment of the invention, an app in the smartphone 10 allows an attendee/participant to call the other smartphone 26 (the moderator's smartphone) through the wireless access point 21. With connection to the public address system, i.e., the amplifiers 16 and speakers 17, the app permits the smartphone 10 to function as a microphone for the attendee/participant caller. The app (or another app on the smartphone 10) also allows the attendee/participant to post his or her profile for viewing by other audience members through their smartphones. These profiles can be so-called social networking profiles, such as those found at Facebook and LinkedIn, or organizational profiles, custom profiles from the attendee/participant or a profile created by the app itself Furthermore, as in the example of FIG. 3, members of the audience can use their smartphones to connect to the central communications point 22 through broadcast WiFi signals to allow the members to see and hear the presentation at the venue directly. Each audience member can hear the audio signals for the public address system from the presentation and questions posed to the moderator, for example, and see the presentation on the visual display system 19 through her smartphone 10. Members of the audience who are aurally and/or visually impaired personally or by their situation at the venue benefit from this feature. Additionally, induction loop systems can also be engaged. Upon receiving an indicator signal the wireless access point 21 can send the audio signals an audio induction loop system for hearing aids in the audience.

With a much shorter signal path as compared to that shown in FIG. 3, any latency is much reduced in the FIG. 4A network arrangement. Latency is manifested in a delay between the caller speaking into his or her mobile phone, for example, and the caller's amplified voice on the public address system. The delay is caused by the caller's voice signals traveling from his mobile telephone through the wireless telephone network of FIG. 3, for example, including possibly the Internet, then back through the wireless telephone network and to the telephone number for the receiver(s) of the central communications point. Physically the audio signals travel nearly a complete circle—from the caller's mobile telephone back to the sound amplification system for the audience. If the delay is sufficiently long, typically in the range from 20 to 100 milliseconds, the delayed voice can interrupt the speaker's thoughts and interfere with his or her speech. The local wireless network illustrated in FIG. 4A has a reduced latency by eliminating the wireless telephone networks illustrated by FIG. 3. Furthermore, the app in the smartphone 10 of an attendee/participant can increase latency so as not to interrupt the caller's thoughts and interfere with speech. If the delay is large enough, a speaker considers the delayed speech as simply background noise. The app also supplies a side-tone to help the attendee/participant caller and moderator speak smoothly and has an algorithm to avoid feedback, the undesired screech heard over public address systems.

FIG. 4B illustrates another local wireless network arrangement. In this example, the control computer 25 takes over some of the functions of the app of the moderator's smartphone 26 and allows a second person at the computer 25 assume some of the responsibilities of the moderator.

Further variations of WiFi networks include simply having the personal mobile communications devices 10 of the audience broadcast digital RF signals on the WiFi band without packetizing. A dedicated RF receiver attached to the public address system handles the reception of the signals. In another variation, a separate WiFi base station is established especially for the smartphones 10 of the attendee/participants and other members of the audience to avoid interference from other signals.

FIG. 4C illustrates another embodiment which uses Bluetooth network technology which is also found in many mobile devices. The nearby computer 25 acts as a Bluetooth receiver and converts the signals into audio signals for the attached public address system. The computer 25 is nearby because the Bluetooth signal range is limited. Alternatively, the computer 25 converts the Bluetooth signals to RF or optical (IR) signals which are received by a dedicated receiver attached to the public address system. The drawings shows that this arrangement also broadcasts Bluetooth signals to allow the audience members to see and hear the presentation at the venue directly through their devices 10. Still another alternative to create a Bluetooth mesh network from the audience's personal mobile communications devices 10 so that a Bluetooth signal is daisy-chained to a distant Bluetooth receiver.

FIGS. 5A and 5B illustrate network arrangements with the use of a dongle, a small electronic unit, attached to the personal mobile communications device 10 of the attendee/participants. For example, a dongle can be plugged into a mobile telephone to transmit and receive either RF (Radio Frequency) or IR (Infrared) signals. As shown in FIG. 5A, the IR signals from a dongle 20 attached to the caller's mobile phone 10 are received either by an IR receiver attached to the public address system's amplifier 16, or by a plurality of IR detector/transmitter/repeaters 21 which are spread around the venue. The detectors/transmitter/repeaters 21 then transmit the IR signals in electronic form to the connected control computer 25. The FIG. 5A drawing shows only one detector/transmitter/repeater 21 receiving IR signals from the caller's mobile telephone 10 and attached dongle 20 for simplicity's sake, but a more accurate representation is that several, if not all, of the detector/transmitter/repeaters 21 receive the IR signals from the dongle 20 at slightly different times and varying strengths. A visual display system is not shown, also for simplicity.

The dongle 20 is connected to the mobile phone 10 through the phone's 3.5 mm audio jack. The dongle 20 receives an electronic audio signal or its PCM (Pulse Code Modulation) representation from the mobile phone 10. The dongle 20 then either uses the PCM formatted data directly to drive its IR transmitter or converts the audio signal to PCM to modulate an IR source, such as an LED, or an RF source on the dongle 20. The PCM signals, a digital representation of sampled audio signals of the caller, are received by one or more of the detector/transmitter/repeaters 21 which transforms the IR or RF signals back into electronic audio data which is sent to the central control computer 25, and the amplifiers 16 and speakers 17. Each dongle 20 also sends its own identification code so that the central control computer 25 recognizes each prospective speaker.

FIG. 5B illustrates this embodiment of the present invention. The dongle 20 translates the audio signals into RF signals, such as FM (Frequency Modulation) signals, which are broadcast by the dongle. A receiver at the computer 25 provides the portal through which the RF signals are received and the computer 25 translates the RF signals into audio data for the amplification system 16 to broadcast through the speakers 17. RF signals, unlike IR signals which are blocked by the walls of the environment, can penetrate the walls of the venue and might be available to outsiders so that the contents of the conference, at least the information imparted by the speakers of the phone 10, may be available to outsiders. This poses a problem if the information is confidential. To avoid undesirable disclosure of the information, the electronic audio data from the phone 10 are encrypted by the dongle 20 before being translated into RF signals and broadcast. Upon receipt at the computer 25, the RF signals are translated back into audio data and decrypted to drive the amplifier system 16 and speakers 17.

Besides different network arrangements, the present invention facilitates the use of the audience's personal mobile communication devices as a microphone at the venue. The computer code directs the control computer 25 so that the central communications point performs some, or all, of the following functions:

1) The computer apparatus receives and answers the phone call. The apparatus can then perform one or more of the following:
   a) A recorded voice acknowledges to the attendee/participant caller that the call has been successfully connected. It may tell the caller his or her place in the queue.
   b) The apparatus sets a line level (amount of signal amplification) according to the strength of the attendee/participant caller's signal in order to provide the preamplifier section of the amplifier system 16 with an optimum signal-to-noise ratio. The apparatus' ability to measure the strength of the attendee/participant caller's signal may require that the caller speak a few words.
   c) The apparatus passes the audio signal to the preamplifier of the amplifier system 16 through its own amplifier stage which adjusts the signal both for volume and output impedance (to match the input impedance of the preamplifier) directly to the "microphone", "mic" or, sometimes, the "line input," of the existing sound system.
   d) The sound system then treats the input in the same manner as it treats a microphone signal.
2) If the call is not passed through directly, the apparatus may do any of the following:
   a) The apparatus can accept calls in an order of priority (the basis of which can be established by the event organizer and communicated to the participants).
      i) The apparatus can assign a place in a queue depending on any number of possible criteria, such as when the call was received, the area code of the caller, the position of the caller in the room, the comparative quality of audio signal, a priority code punched in by the caller, etc.
   b) The apparatus can call back attendee/participant callers, in time to re-establish the connection, when it becomes a caller's turn to speak.
      i) The apparatus can record the phone number of the attendee/participant caller.
      ii) The apparatus can hang up the phone, and dial the caller back when the caller's turn to ask a question comes up.
3) The apparatus can put the call on hold, and take the call off hold, when the attendee/participant caller's turn comes up. 3. Alternatively, since most calls are questions from the audience interspersed with answers by the person to whom the question is addressed, the apparatus can avoid feedback or simultaneous input from speaker and respondent by allowing an attendee/participant caller to:
a) Ask a question and hang up.
  i) The question can be recorded and played back when the caller's turn comes up.
b) Ask a question and stay on the line. (The attendee/participant caller can put his/her phone on mute or the moderator can put the call on mute. The apparatus can put the call on mute while the respondent is answering.) (An automatic delay can be built in so that a follow-up question is less likely to overlap an answer.)
c) The apparatus can employ other feedback-prevention techniques, such as the introduction of a short delay.

In order to accommodate more simultaneous callers than can be handled by the telephone receiver(s) in the central communications point, the phone number provided to the attendees may be that of a telephone call center which can receive simultaneous, multiple calls, buffer, prioritize, store, and redirect them one-at-a-time to the telephone receiver in the central communication point.

Rather than the control computer 25 (in FIG. 3, for example), the central communications point can also operate through a smartphone of the moderator, such as the network arrangement illustrated by FIG. 4A. An app in the smartphone 26 allows the moderator to control the queue of attendee/participant callers. The moderator can see the social networking profiles of the callers through his app; conversely the audience can also see the profiles of the callers (and other audience members) through the moderator's app and the apps on their own smartphones. Through the app the moderator can see the queue and assign a caller to a place in the queue; the caller can also see his place in the queue through the app on his personal mobile communications device 10. Through his app, the moderator can see a text of a question or a summary of the question which an attendee/participant caller has sent to the moderator. A caller's question and comments can be recorded and the app permits the moderator to decide when the question and comments can be replayed over the public address system or to simply connect the selected caller to the public address system and have the caller repeat her question and comments directly to the audience through her smartphone as microphone. Alternatively, the moderator through the app can repeat a caller's question by text. For control over the callers, the moderator's app permits the moderator to open and close the caller's microphone function during an address over the public address system, for example, or to allow the caller the control of her smartphone.

Finally, the app in the smartphone 10 of an audience member can be used to allow the member to see and hear the presentation at the venue directly. The audience member can hear the presentation from audio signals broadcast from the presentation at the venue's podium, for example, and see the presentation from broadcast video signals if a camera is also capturing the presentation.

There are also some additional features that may be combined into the system as already described. Besides audio information, the present invention also handles text, graphic and video information whether supplied by the speaker or uploaded by an attendee/participant in novel ways. The visual display systems 19 illustrated in FIGS. 3, 4A-C and 5A-B can handle text, graphic and video information sent by, or related to, an attendee/participant and can be presented to the audience to enhance a question or comment by the attendee/participant.

Not only are the prospective attendee/participant callers placed in a queue for speaking as described above, the place of each prospective caller in the queue can be displayed on the visual display system 19. In this manner each speaker is prepared for his or her turn. This is particularly useful if the queue is not displayed on the personal mobile communications device 10 of the caller.

The visual display system 19 displays prospective questions from the audience and from the attendee speakers. The questions can be sent in by text over personal mobile communication devices 10, or less conveniently by stand-alone computers if the person is listening from a location removed from the venue. If the question from the prospective speaker has been recorded, the question is translated into text by speech recognition software, such as that sold by Microsoft Corporation of Redmond, Wash., and Nuance Communications in Burlington, Mass., and the text placed on the visual display system 19. The questions on the visual display system 19 provide the audience an opportunity to ponder the issues raised by the questions before they are asked and increase the venue experience.

For each question there is some indication to its source/prospective speaker on the visual display system 19. The indication can be the e-mail address of the prospective speaker, or any on-line identity provided by the prospective speaker, for example, his or her profile posted in Facebook and LinkedIn social/business networking websites so that members of the audience can learn more about who is speaking and contact a speaker if they so desire.

The technology enabled herein includes a method for centrally controlling communication at a single venue. The method provides a central communication point comprising a processor and a moderator (which may be fully automated by the processor or by a live presenter). Personal mobile communications devices of the audience members are used. Each device is a transmitting device (and preferably also with a receiving functionality) and a display device for providing member information and viewing. The device at least transmits electronic signals comprising audio signals (and preferably other electronic signals, including text and video) to the central communication point. The moderator enables at least one electronic communication transmission from the member device, which device has access to the central communication point to have at least part of the transmission broadcast as video content at the venue and allow open audio communication from the device to be broadcast at the venue. The member information may be transmitted by wireless cellular phone transmission to a telephone system at the central communication point. The user information may be transmitted by WiFi processor-based transmission to the processor at the central communication point. The processor at the central communication point may receive transmission through a hard-wired system. The electronic communication transmission may include textual information, audio information, web-accessing information and the like. Each electronic communication from a member may be queued for response at the central communication point and may be informed of the position in the queue by the processor at the central communication point. The electronic communications from each device may be queued for response at the central communication point.

By rearranging the settings in the system, it is possible for a smartphone user, using the app, to communicate directly over the Wi-Fi system established by the Wi-Fi base station 21 to all of the other smartphone users effectively creating an ad hoc public address system limited only by the Wi-Fi coverage. In venues without a Wi-Fi system, the base station within a phone equipped with a mobile hot spot capability can broadcast its own Wi-Fi signal acting as a base station or access point. Those attendees wishing to hear, can listen over wired headphones, Bluetooth headphones, Bluetooth equipped hearing aids, holding their phones to their ears in the normal manner or placing their phones in speakerphone mode. Attendees who do not have a phone or a phone that can utilize the app can request that nearby attendees place their phones on speakerphone mode. In this way even if only ⅓ of the attendees are properly equipped, providing they are distributed throughout the venue and all put their phones on speakerphone, everyone may be able to hear.

The rearrangement of the settings referred to above consists of reversing certain settings allowing the moderator/host side of the app to broadcast to all of the attendees. In this mode, the moderator uses his or her microphone as if he/she were an attendee speaking, and the attendee's side of the app receives the audio signal as if it were the moderator's app receiving a signal.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications, and the titles were selected only to provide a guide to the reader and should not be considered as limiting the subject matter of the entitled text. This description will enable others skilled in the art to best utilize and practice the invention in various embodiments and with various modifications as are suited to a particular use. The scope of the invention is defined by the following claims.

We claim:

1. A method of hybrid broadcasting from mobile devices, comprising the steps of:
    accepting submitted broadcasting requests from one or more mobile devices of a mobile device group, the mobile device group comprising one or more local mobile devices and one or more remote mobile devices;
    selecting a selected mobile device from the one or more mobile devices submitting broadcast requests;
    broadcasting data in a humanly perceptible form from the selected mobile device using an in-person public-address system, the one or more local mobile devices being within humanly perceptible proximity of the in-person public-address system; and
    broadcasting data in a humanly perceptible form from the selected mobile device using each of the one or more remote mobile devices generally simultaneously with the step of broadcasting data in a humanly perceptible form from the selected mobile device using the in-person public-address system, the one or more remote mobile devices being beyond humanly perceptible proximity of the in-person public-address system.

2. The method of claim 1, further comprising the step of:
    blocking selectively mobile devices of the mobile device group exclusive of the selected mobile device from transmitting at least a portion of the data to the in-person public-address system and from transmitting at least the portion of the data to remote mobile devices of the mobile device group.

3. The method of claim 2, wherein all mobile devices exclusive of the selected mobile device are blocked from transmitting at least the portion of the data to the in-person public-address system and are blocked from transmitting at least the portion of the data to all mobile devices of the mobile device group exclusive of the selected mobile device.

4. The method of claim 2, wherein only a portion of the mobile devices of the mobile device group exclusive of the selected mobile device are blocked from transmitting at least the portion of the data to the in-person public-address system and are blocked from transmitting at least the portion of the data to all mobile devices of the mobile device group exclusive of the selected mobile device.

5. The method of claim 1, wherein the data comprises audio data.

6. The method of claim 5, wherein the audio data is captured by the selected mobile device in real time.

7. The method of claim 1, wherein the data comprises visual data.

8. The method of claim 7, wherein the visual data is captured by the selected mobile device in real time.

9. The method of claim 1, wherein the data comprises audio data and visual data.

10. The method of claim 9, wherein the audio data and visual data is captured by the selected mobile device in real time.

11. The method of claim 1, wherein at least one mobile device of the mobile device group is configured as a smartphone.

12. The method of claim 1, further comprising the step of:
    serially selecting at least two distinct mobile devices of the mobile device group as the selected mobile device.

13. A method of conducting a hybrid meeting using mobile devices, comprising the steps of:
    collecting in-person data via an in-person audio/visual system;
    collecting remote data from one or more remote mobile devices located beyond humanly perceptible proximity of the in-person audio/visual system;
    broadcasting the in-person data and the remote data in a humanly perceptible form using the in-person audio/visual system; and
    broadcasting the in-person data and the remote data in a humanly perceptible form using one or more remote mobile devices generally simultaneously with the step of broadcasting the in-person data and the remote data in a humanly perceptible form using the in-person audio/visual system, the one or more remote mobile devices being beyond humanly perceptible proximity of the in-person audio/visual system.

14. The method of claim 13, further comprising the step of:
    broadcasting the in-person data and the remote data in a humanly perceptible form using one or more local mobile devices generally simultaneously with the step of broadcasting the in-person data and the remote data in a humanly perceptible form using the in-person audio/visual system, the one or more local mobile devices being within humanly perceptible proximity of the in-person audio/visual system.

15. A system for hybrid broadcasting from mobile devices, comprising:
    a central communication processor and controller configured to:
        accept submitted broadcasting requests from one or more mobile devices of a mobile device group, the mobile device group comprising one or more local mobile devices and one or more remote mobile devices;

select a selected mobile device from the one or more mobile devices submitting broadcast requests; and a broadcasting system configured to broadcast data in a humanly perceptible form from the selected mobile device using an in-person public-address system, the one or more local mobile devices being within humanly perceptible proximity of the in-person public-address system; and broadcast data in a humanly perceptible form from the selected mobile device using each of the one or more remote mobile devices generally simultaneously with the step of broadcasting data in a humanly perceptible form from the selected mobile device using the in-person public-address system, the one or more remote mobile devices being beyond humanly perceptible proximity of the in-person public-address system.

16. The system of claim 15, wherein the central communication processor and controller is further configured to selectively block mobile devices of the mobile device group exclusive of the selected mobile device from transmitting at least a portion of the data to the in-person public-address system and from transmitting at least the portion of the data to remote mobile devices of the mobile device group.

17. The system of claim 15, wherein the central communication processor and controller is further configured to block all mobile devices exclusive of the selected mobile device from transmitting at least the portion of the data to the in-person public-address system and are blocked from transmitting at least the portion of the data to all mobile devices of the mobile device group exclusive of the selected mobile device.

18. The system of claim 15, wherein the central communication processor and controller is configured to block only a portion of the mobile devices of the mobile device group exclusive of the selected mobile device from transmitting at least the portion of the data to the in-person public-address system and are blocked from transmitting at least the portion of the data to all mobile devices of the mobile device group exclusive of the selected mobile device.

19. The system of claim 15, wherein the data comprises audio data.

20. The system of claim 19, wherein the audio data is captured by the selected mobile device in real time.

* * * * *